March 19, 1929.  P. J. CLIFFORD  1,705,658
ROTARY DISTANCE TRAIN CONTROL MECHANISM
Filed Jan. 15, 1926  7 Sheets-Sheet 3

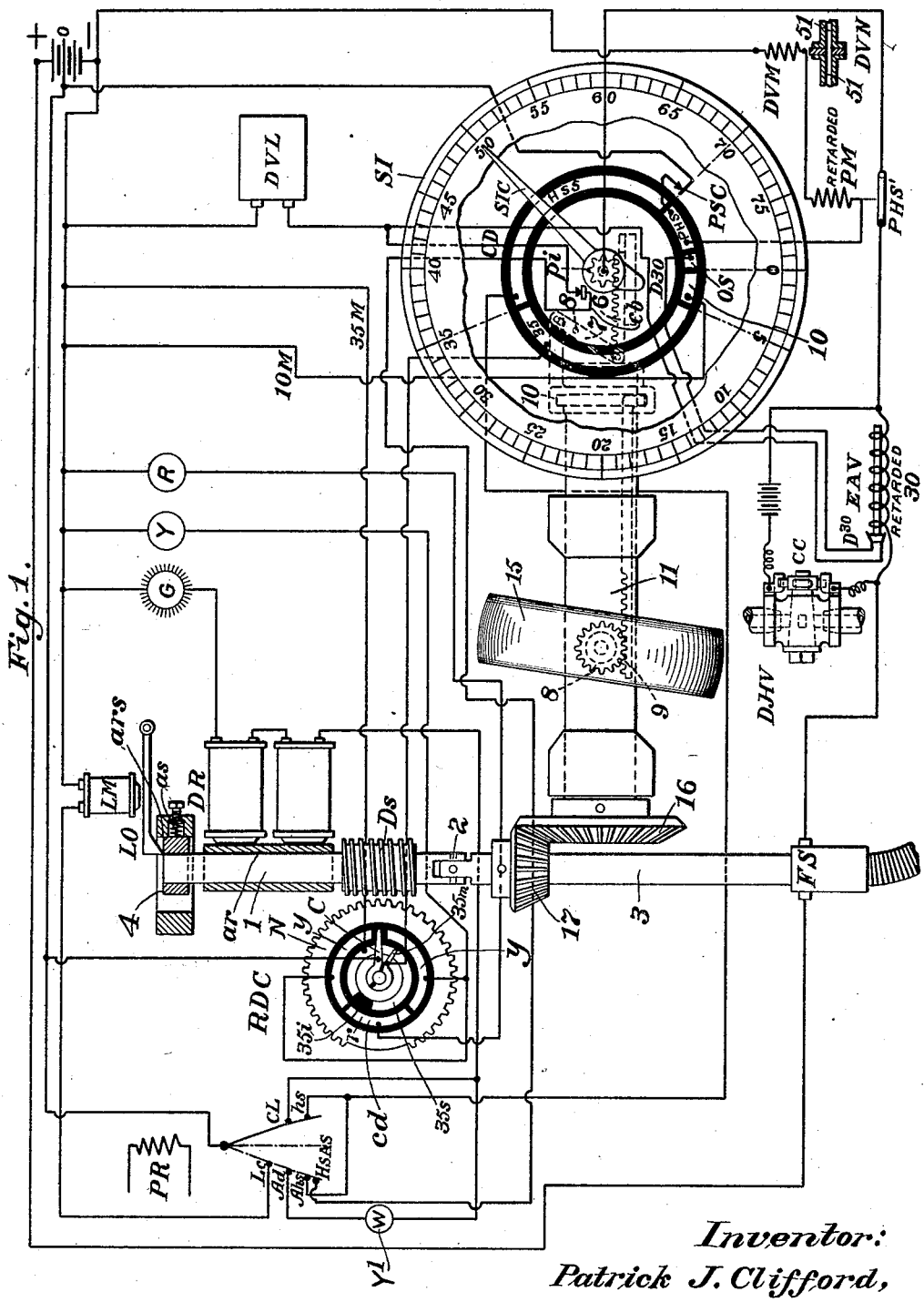

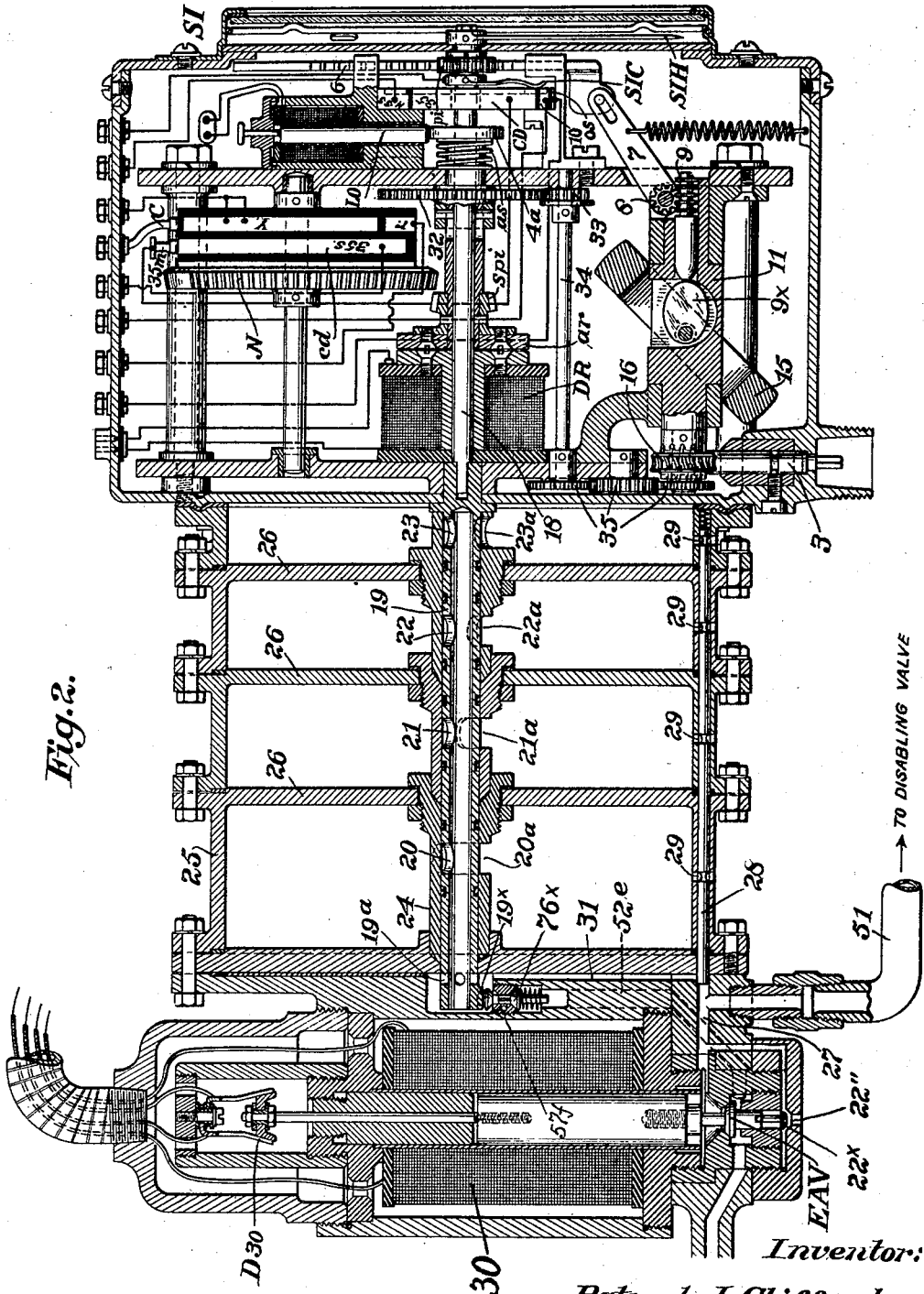

Inventor:
Patrick J. Clifford,
by Spear, Middleton, Donaldson & Hull
Attys.

March 19, 1929.   P. J. CLIFFORD   1,705,658
ROTARY DISTANCE TRAIN CONTROL MECHANISM
Filed Jan. 15, 1926   7 Sheets-Sheet 4
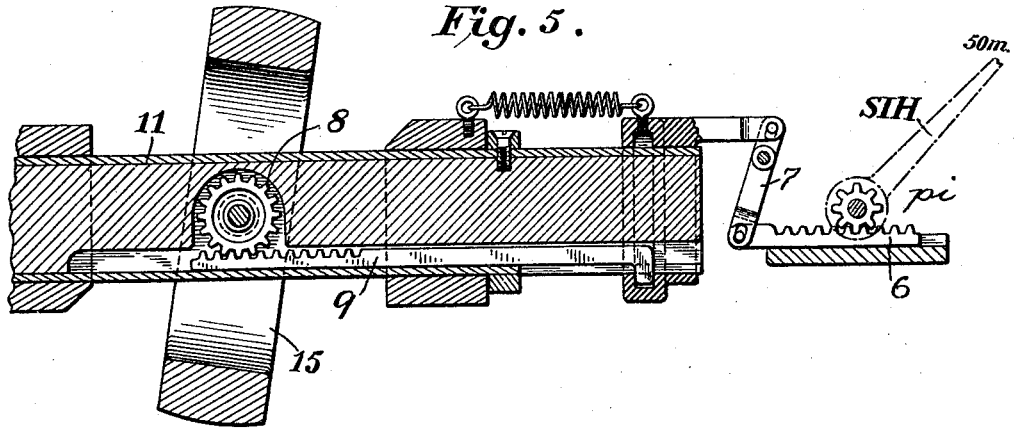
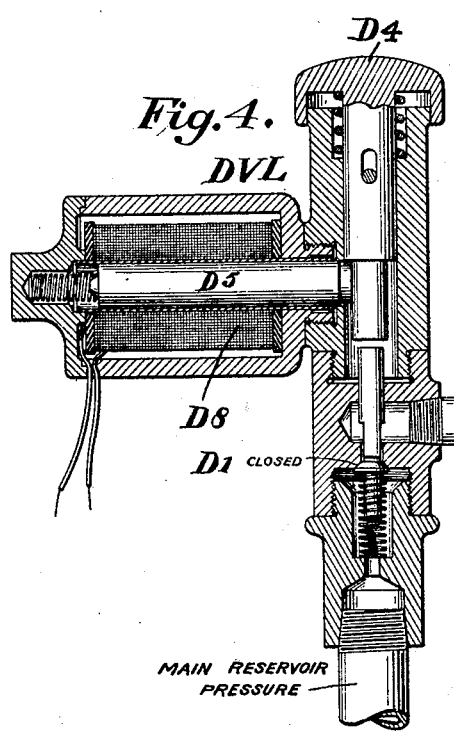
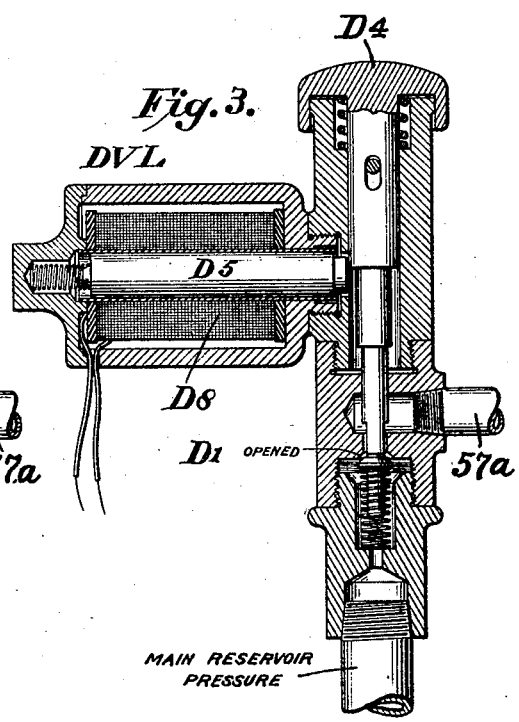
Inventor:
Patrick J. Clifford, March 19, 1929.  P. J. CLIFFORD  1,705,658
ROTARY DISTANCE TRAIN CONTROL MECHANISM
Filed Jan. 15, 1926  7 Sheets-Sheet 5
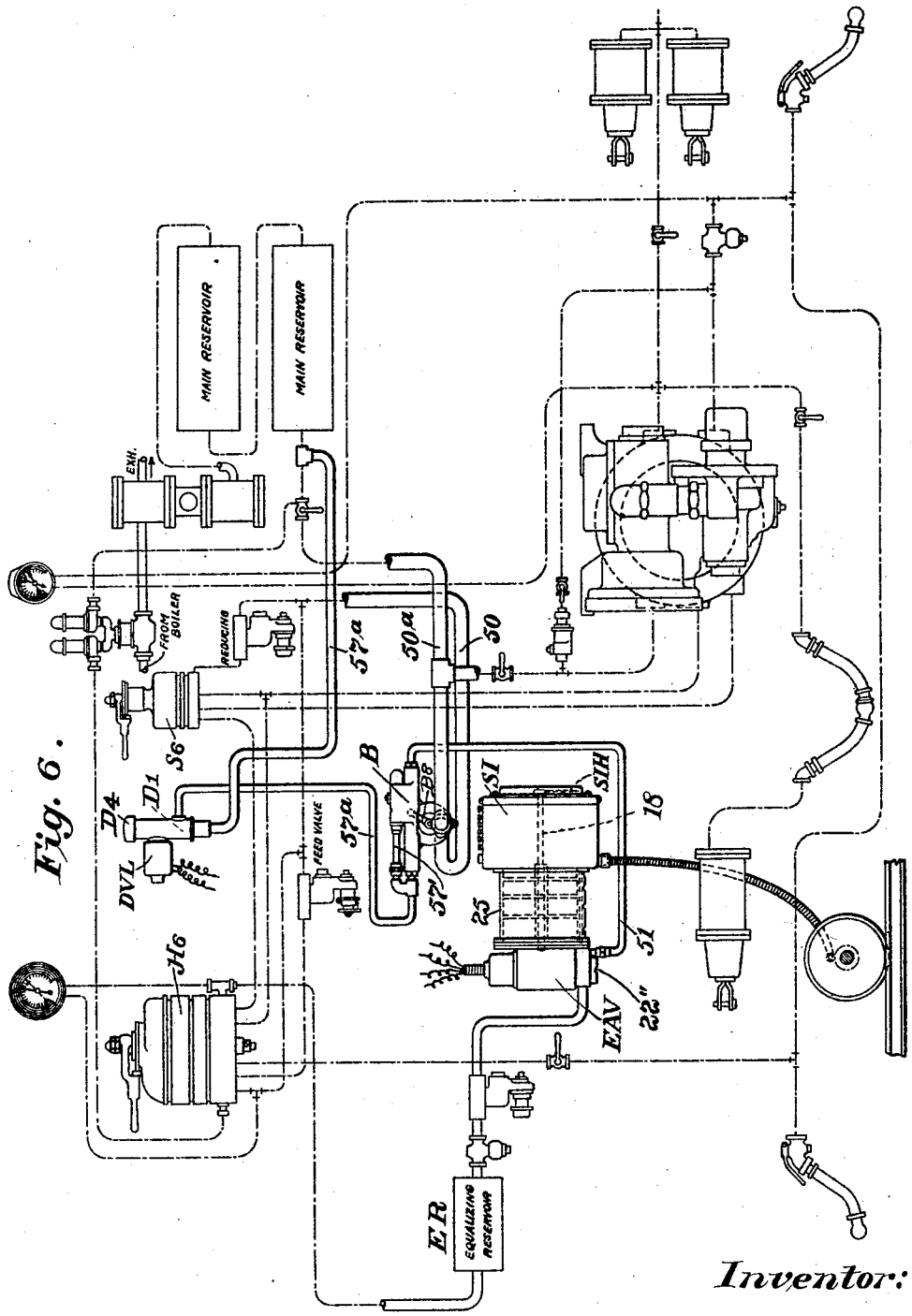
Inventor:
Patrick J. Clifford,
by
Attys.

March 19, 1929.  P. J. CLIFFORD  1,705,658
ROTARY DISTANCE TRAIN CONTROL MECHANISM
Filed Jan. 15, 1926  7 Sheets-Sheet 6
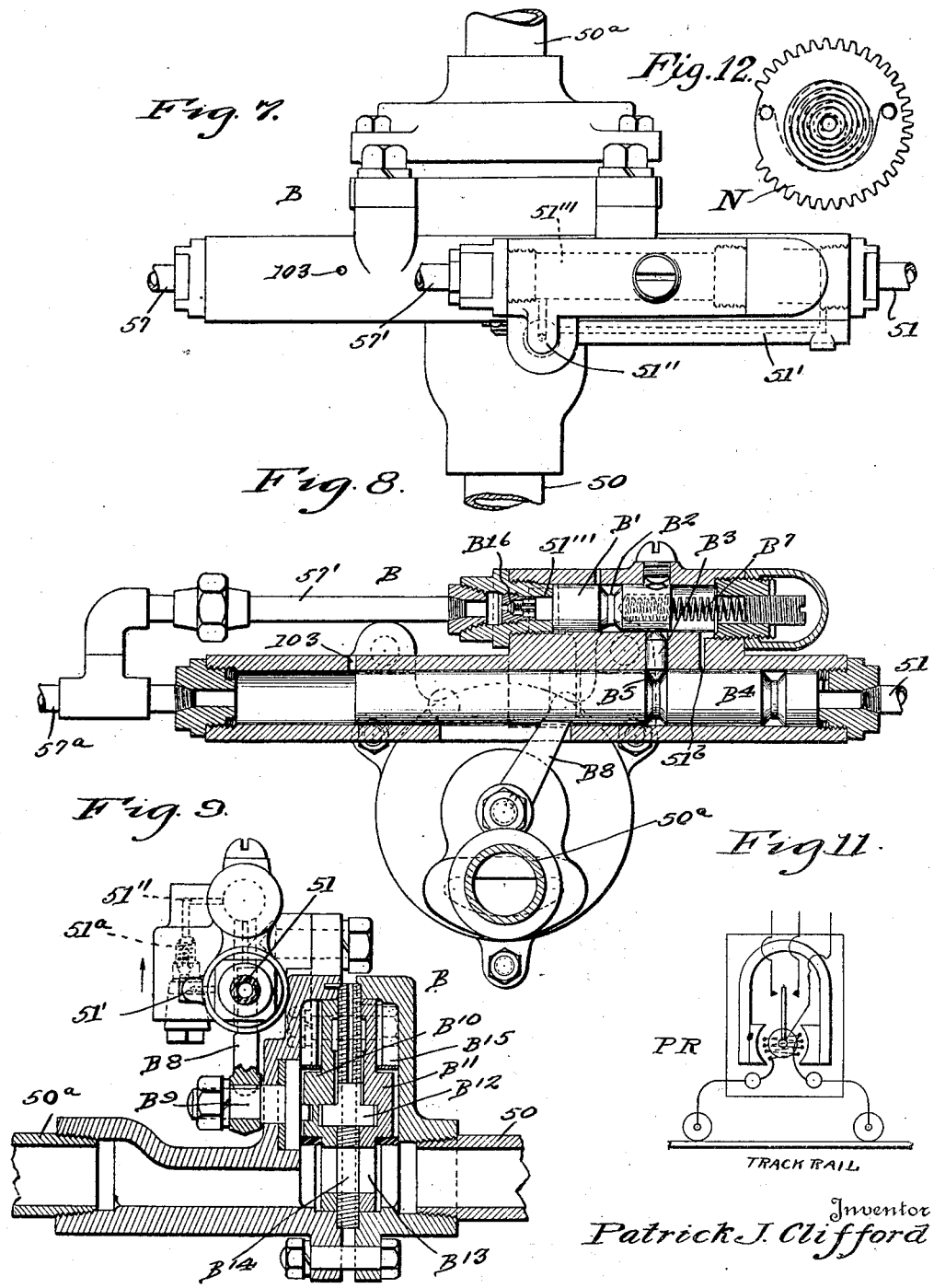
Inventor
Patrick J. Clifford

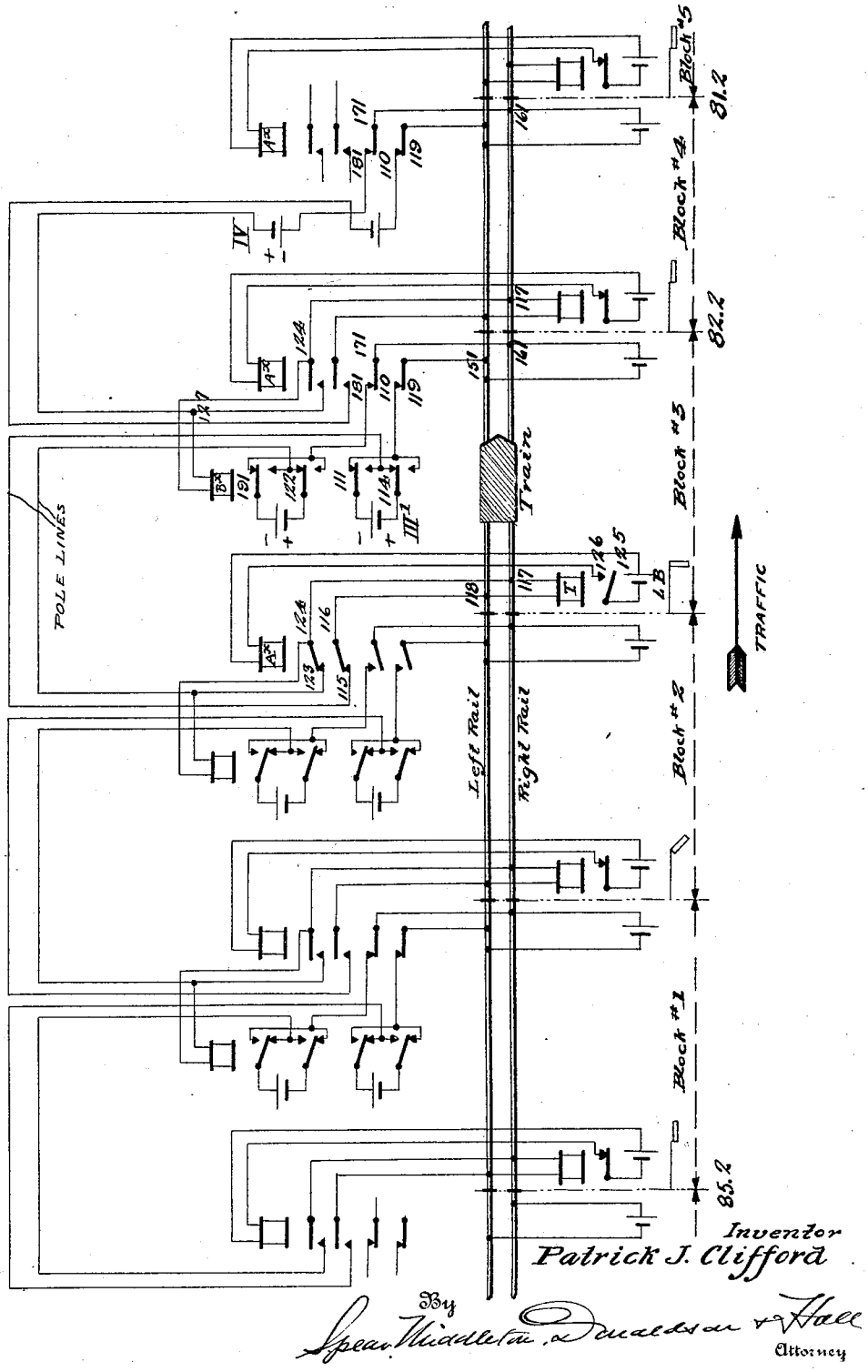

Patented Mar. 19, 1929.

1,705,658

UNITED STATES PATENT OFFICE.

PATRICK J. CLIFFORD, OF FALLS, PENNSYLVANIA, ASSIGNOR TO TRAIN CONTROL CORPORATION OF AMERICA, OF NEW YORK, N. Y., A CORPORATION OF DELAWARE.

ROTARY DISTANCE TRAIN-CONTROL MECHANISM.

Application filed January 15, 1926. Serial No. 81,457.

One object of the invention is to provide control mechanism located on the engine or vehicle for controlling the brake mechanism of the train under various conditions, said mechanism including a speedometer controlling certain circuits in cooperation with rotary distance control mechanism, the operation of the latter being under control of a primary relay.

Various other objects of the invention will be clear from the following description.

In the drawings:

Figure 1 is a diagram of apparatus on the engine, only enough of the mechanical elements being shown to lead to an understanding of the general actions, the details being shown in other figures.

Figure 2A:
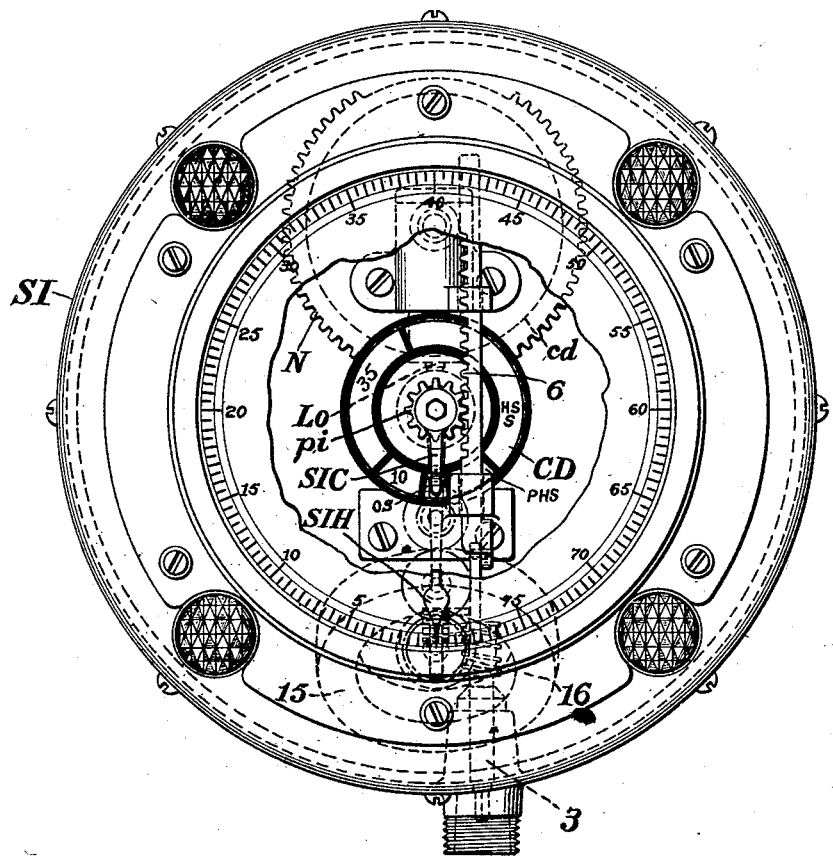
Fig. 2 is a sectional view of the automatic air valve, which reduces equalizing reservoir pressure for an automatic application of the brakes and other parts of the apparatus.

Fig. 2$^a$ is a view looking from the right of Fig. 2.

Figs. 3 and 4 are sectional views of the disabling valve lock.

Fig. 5 is a detail view of the means for operating the speed indicator.

Fig. 6 is a further diagram of engine equipment.

Figs. 7, 8 and 9 are views of the engineer's disabling valve.

Fig. 10 is a view of track circuits.

Fig. 11 is a diagram of the primary relay.

Fig. 12 is a view of spring means for returning the gear N.

The system will include track circuits and some of the other features shown in my prior application by which, when the vehicle is in the block preceding the caution block, an advance caution indication will be given in the cab of that vehicle, due to a reversal of polarity in the track rails of this advance caution block.

The caution block is electrically dead and the occupied block has its traffic rails energized with a current of normal polarity, this current being imposed on said rails as a consequence of the vehicle occupying this block with clear conditions ahead, and this imposed current may be additional to that of the ordinary wayside signal current, or it may be used alone when the system is installed in territory not equipped with wayside signalling means.

The system is one of continuous control. The engineer's cab, besides having automatic brake apparatus, is equipped with signals to show the traffic conditions. One or the other of these signals is displayed at all times to continuously indicate to the engineer the traffic conditions and the changes taking place therein.

The system may be used either with or without roadside signals.

The apparatus includes, generally speaking, an automatic air release valve EAV controlled by a solenoid 30 for automatically causing (as described later) a brake application when the said solenoid 30 is deenergized as a consequence of unsafe conditions existing in advance and the engineer failing to act. There is also an engineer's disabling valve indicated generally at B for closing the pipe leading from the main reservoir to the engineer's automatic brake valve H$^6$, of the Westinghouse system, so that when the automatic air release valve EAV operates to cause an automatic brake application, the engineer will be disabled from recharging the train line and defeating braking until safe conditions again exist. He may, however, make a further brake pipe reduction manually, to augment the braking which has been brought on automatically.

There is also a disabling valve lock DVL to maintain the disabled condition of the engineer for a prescribed period or until conditions of safety have been attained, as will be described later.

The automatic air brake system is operated by equalizing reservoir air pressure and in causing an automatic brake application the opening of valve EAV reduces equalizing pressure in the equalizing piston chamber of the engineer's automatic brake valve H$^6$ of the Westinghouse system, allowing the equalizing piston of said chamber to rise and cause a brake application proportionate to the speed. In case of breakage of any of the parts of the automatic air brake apparatus, resulting in the loss of equalizing reservoir air pressure, an automatic brake application will result by the rise of the piston in equalizing piston chamber D of the engineer's valve H⁶, and the opening of the BPEx port of that valve.

The engine is equipped with a system of continuous signals, i. e., clear (green), caution (yellow), danger (red), and also with an "advance caution" signal which may be made up of a single color distinct from any of the above, or may be made up of a combination of said signals, such, for instance, as yellow and green. That is to say, when the engineer observes the two signals yellow and green persisting at the same time in his cab, he will know that he is in the "advance caution" block; that is, the block in advance of the caution block, and that he is approaching said caution block.

If roadside signals are employed, though these are not necessary where our continuous cab signals are used, the engineer, when he observes the "advance caution" signal, will know that he is approaching a yellow board.

The electrical apparatus on the vehicle includes a polarized primary relay PR which picks up current from the track and controls the automatic brake apparatus and also the cab signal system. The cab signal system, as well as the automatic air brake solenoid 30, are controlled, generally speaking, by the conjoint effects of the electrical condition of the block through the primary relay PR and the speed of the train.

Entering into this control is a speed indicator SI having an electric current distributer CD for closing different circuits under different traffic conditions, and there is also a rotary distance control mechanism RDC also having an electric current distributer cd, both of these mechanisms being operated from the axle of the moving vehicle, as will be more fully described later.

The rotary distance control RDC under safe conditions is inactive, but when unsafe conditions exist this rotary distance control comes into play and at certain moderate speeds defers automatic braking for a certain distance of travel of the train into the caution block.

There is also a lock LO which acts in connection with the rotary distance control mechanism, that is, when unsafe conditions exist and when this rotary distance control mechanism begins to function, the lock LO will maintain the said mechanism in operation, so that it will complete its cycle and continue its control until such time that a safe condition again obtains. In other words, this lock LO will not release the rotary distance control mechanism for its restoration to normal inactive position, until the condition of the block changes to that of "advance caution" consequent upon the train ahead getting into the second block ahead, whereupon the primary polarized relay PR will be subjected to a reverse polarity current, will make contact at Lc and thereby energize magnet LM, resulting in release of lock LO from the rotary distance control mechanism, and allowing its magnets to restore its armature ar and release the rotary member N for its return to normal position.

The circuits controlling the automatic brake solenoid 30 and the cab signals are controlled by the primary relay PR, also by a travelling contact connected with the hand SIC of the speed indicator SI and by rotary contacts C and 35m of the rotary distance control mechanism RDC.

Taking up the mechanism more in detail and referring to Fig. 2 and the diagrams, the speed indicator hand SIH of the speed indicator SI is operated over its fixed dial through a pinion pi, Fig. 2 rack bar 6, lever 7, pinion and rack 8, 9, and cam 9ˣ, on the shaft of the gyroscopic weight 15. This shaft is journaled in a shaft 11, which is rotated through gearing 16 from the shaft 3 which is driven from the axle of the vehicle by any ordinary flexible shaft. On the same sleeve with the indicator hand SIH there is mounted a contact arm SIC, see the diagram 1 and Fig. 2, to move over segments of an electric current distributer CD to close different circuits. This distributer has a contact segment HSS for high speed, a segment 35 for thirty-five miles per hour, a ten mile per hour segment 10, a no speed segment OS, and a prohibited high speed segment PHS. The circuits controlled by these segments and the speed indicator contact SIC will be described later.

As shown in the diagram Fig. 1, the rotary distance control elements proper may comprise a worm DS, the shaft 1 of which is coupled by a universal or other flexible joint with the shaft 3, although, as hereinafter pointed out, this worm and its pivotally mounted shaft may be dispensed with and other means of drive may be employed, and this will be later described in connection with Fig. 2. The shaft 1 of the worm DS carries an armature ar of distance relay magnets DR.

When these magnets are energized through the primary relay PR, the armature ar and shaft 1 will be held in vertical position and the worm will not be in mesh with the mutilated gear N of the rotary distance control RDC, but when the contact arm of primary relay assumes neutral position by reason of not receiving current from the track rails, the magnets DR will be deenergized and the armature ar will fall leftward and the worm DS will engage the mutilated gear and begin to rotate it in either one direction or the other, according to the direction of the train's movement.

When the armature and worm fall leftward, as just stated, the lock LO drops behind the block 4 carried by the shaft 1, and holds the worm in this position (even though the magnets may be again energized), until an advance caution condition is set up by the train in advance getting into the second block ahead which will supply a current of reversed polarity to the polarized primary relay of the vehicle in the advance caution block, causing this to reverse and make contact at Lc, thus energizing magnet LM and lifting lock LO, so that the armature ar can be drawn to the right by the magnets DR and withdraw the worm from the mutilated gear N.

This gear has fixed thereto contact arms C and 35m, working over a current distributer cd having contact segments r, y, 35s, and there are insulated portions, on one of which the arm C normally rests, as in Diagram 1, and the other insulated portion is shown at 35i, on which the contact arm 35m rests when a certain movement takes place.

The contacts which are closed by the swinging arm of the primary relay PR are as follows: When the relay receives current of normal polarity its arm swings to the right and contacts with contact CL, meaning "clear," and hs, meaning "high speed," and when this primary relay is energized with a current of reversed polarity, its arm swings leftward and engages contacts Lc, ad, Ahs, and HSAS. Lc is the contact controlling the circuit of magnet LM of the lock LO. Contact Ad controls the circuit of the advance caution signal $Y^1$. Contact Ahs is the high speed contact for the advance caution block. Contact HSAS is the high speed advance signal contact.

*Graduated automatic service application.*

By referring to Fig. 2 it will be seen that the principles illustrated by Fig. 1 are embodied in a different mechanical organization of elements in which, for instance, instead of having a worm DS, a sliding pinion spi cooperates with a mutilated bevel gear N, all as will be later described. This Fig. 2 is now referred to as showing how a graduated service application of the brakes can be effected, dependent upon the speed of the train, the control being exerted by the speed indicator SI. The shaft 18, Fig. 2, of the speed indicator, which carries the pointer SIH and the travelling contact SIC, is connected with a valve member in the form of a hollow shaft 19. This turns with the indicator hand and contact to bring its openings 20, 21, 22, 23, one after the other, to register with companion openings $20^a$, $21^a$, $22^a$, $23^a$ in a tubular casing 24 suitably fixed in a receiver or chamber 25, which receiver is divided into chambers by partitions 26. These chambers are to receive equalizing reservoir air pressure, one or more, according to the speed of the train. If the train is running at high speed, all the ports 20, 21, 22 and 23 will be open to their respective chambers, and upon the solenoid 30 becoming deenergized by reason of the vehicle entering the electrically dead territory of a caution block, the valve EAV will open by weight of the core and allow equalizing reservoir air to pass through port 27, where it will act upon bleed port plunger 28 and move it to the right to close all of the bleed ports 29 of the various chambers, and the equalizing air pressure, having moved piston 28 to the right, will gain access through passage 31 and ports $19^a$ to the rotary valve tube 19, and through its various ports to the several chambers, for, say a 25 lb. reduction, of equalizing reservoir pressure. This will make a corresponding reduction in the equalizing piston chamber (D) of the ordinary engineer's automatic brake valve $H^6$ of the Westinghouse system, allowing the piston therein to rise under pressure of the train line air below it, thus opening the BPEx port of this well known valve and allowing train line air to reduce and cause an automatic service application, to the degree above stated.

If the train is running at, say, a low speed when the EAV valve opens, the speed indicator will have turned to such a position that only the port 20 of the rotary tubular valve 19 will be open, and only the left hand chamber will receive equalizing reservoir air, and therefore there will be a comparatively light application of the brakes, and so at higher speeds the other chambers will be opened, one after the other so that one or more are open at the same time according to speed, for receiving equalizing air pressure, and thus reducing pressure in the said chamber D for the opening of the BPEx port of the engineer's automatic brake valve, for a heavier application.

*Engineer's disabling valve.*

This valve is shown generally at B. It is located in the pipe $50^a$, 50 which conducts main reservoir air to the engineer's automatic brake valve $H^6$ for use in recharging the train line. When the valve EAV opens, consequent upon the deenergizing of the solenoid 30, equalizing reservoir air will immediately go through pipe 51 to the right hand side of piston $B^4$ of the disabling valve B, Fig. 8, and move this leftward, thus operating valve lever $B^8$ to close pipe 50, $50^a$, and thus disable the engineer from recharging the train pipe and releasing the brakes.

The operation of this valve is as follows, referring to Figs. 7, 8 and 9.

The equalizing reservoir pressure passing through the opened valve EAV and the pipe 51 passes through conduit 51', check valve 51$^a$, port 51'' into chamber 51''' and pushes piston B$^1$ to the right until the annular locking groove B$^2$ comes opposite the locking plunger B$^3$, which is now free to move into this groove, which it now does, owing to the leftward movement of the piston B$^4$, which movement is no longer resisted by the plunger B$^3$, the latter entering the groove B$^2$ as a consequence of the inclined side of locking notch B$^5$ working under the plunger. The piston B$^4$ moves leftward because of equalizing air pressure from pipe 51 acting upon its end. The leftward movement of this piston continues until the locking notch B$^6$ in the piston B$^4$ comes under the locking plunger B$^3$, at which time a port 51$^b$ is uncovered, admitting equalizing air pressure to the right of piston B$^1$, which, aided by the pressure of the spring B$^7$, moves said piston leftward, thereby causing the inclined wall of groove B$^2$ to force the locking plunger B$^3$ into the notch B$^6$, which locks piston B$^4$ in its leftward position. Now when the piston B$^4$ moves to the left, it moves lever B$^8$ which is keyed to a shaft B$^9$, which rotates two discs B$^{10}$ and B$^{11}$, which are keyed to each other by a key B$^{12}$. This motion of the lever B$^8$ turns the discs to close an opening B$^{13}$ in a stationary disc or partition B$^{14}$, and this cuts off communication between the pipes 50, 50$^a$, thus cutting off the supply of main reservoir air from the engineer's automatic brake valve H$^6$, and therefore preventing him from recharging the train line until after the train has stopped (except under conditions hereinafter mentioned), and equalizing air pressure has bled away from the valve organization B back through pipe 51 and through bleed port 22'', Fig. 2, to atmosphere. The rotary discs are held air sealed on their seats through air seal cavities which are in communication with atmosphere and by springs B$^{15}$.

The bleed port 22'', Fig. 2, is controlled by the supplemental valve 22$^x$ attached to the core of solenoid 30, that is to say, when the solenoid 30 is energized and the valve EAV is closed, the supplemental valve will open bleed port 22'', Fig. 2, for the bleeding of the pressure from the pipe 51 and the disabling valve to atmospher, and when the solenoid is deenergized and valve EAV opens, the supplemental valve will close bleed port 22''.

*Disabling valve lock.*

The disabling valve is restored to normal position to open communication between the pipes 50, 50$^a$, so that the engineer can then recharge the train line as follows: After the air has bled off from the right hand side of the piston B$^4$ of the engineer's disabling valve through pipe 51 and port 22'', the engineer can supply main reservoir air to the left hand sides of pistons B' and B$^4$ by opening valve D$^1$, Figs. 3 and 4, only, however, if the disabling valve lock DVL has assumed release position, Fig. 3, due to the energizing of its magnet D$^8$ and retraction of its bolt D$^5$ from push rod of the operating knob D$^4$. This magnet D$^8$ will be energized under either one of two conditions. One of these is when the contact SIC of the speed indicator gets on the no speed contact OS of the current distributer CD, when the train comes to a stop, and the other condition is when the arm of the primary relay PR, under a change of polarity in the track circuit, due to the train ahead getting into the second block in advance, swings to the left into engagement with the contact HSAS.

When magnet D$^8$ is energized it retracts the locking bolt D$^5$ and only then can the engineer, by pushing down on the knob D$^4$, open the valve D$^1$ and permit air from the main reservoir to pass through pipe 57$^a$ and branch 57$^1$, Figs 6 and 8, and move the pistons B$^1$ and B$^4$ of the engineer's disabling valve to the right to normal position and thus open pipes 50, 50$^a$, for supplying the engineer's automatic service valve H$^6$ with air for recharging the train line and releasing the brakes at the will of the engineer.

The parts shown in Figs. 3 and 4 we designate the disabling valve lock, because it involves the locking bolt D$^5$, which prevents the engineer from opening valve D$^1$ and supplying air to the disabling valve to restore it to normal position. When this locking bolt is retracted, however, by the magnet D$^8$, the engineer, by pressing on the knob D$^4$, can open valve D$^1$, and thus deliver air pressure from the main reservoir to set the disabling valve in open position.

In this restoring action of the engineer's disabling valve the air pressure going through branch 57' passes through check valve B$^{16}$ into chamber 51''' and operates piston B$^1$ to the right against resistance of spring B$^7$ until locking groove B$^2$ in the piston B$^1$ comes opposite the locking dog or plunger B$^3$, which is then free to rise into this groove, which happens owing to the incline of notch B$^6$ of piston B$^4$ working under it. This action takes place because piston B$^4$ is forced rightward by air pressure from the main reservoir through valve D$^1$ when this is unlocked and operated by the engineer.

The piston B$^4$ now continues its movement to the right, until notch B$^5$ comes opposite the plunger B$^3$. When this happens a port 103 at the left of piston B$^4$ opens and allows the pipe 57$^a$ to bleed air pressure off from the valve D$^1$ to atmosphere. The piston B$^1$ now moves leftward under action of the spring B$^7$, and the disabling valve is thus fully restored, and locked by plunger B³ against displacement by jar.

High speed clear block.

The apparatus as shown in diagram Fig. 1 indicates the normal high speed condition with the cab signal giving notice of the condition of the block being approached and the position of the semaphore of the fixed signal in advance, if roadside signals are used.

It will be seen that each condition provides its own circuit and as there cannot be two conditions existing at one and the same time, there will not be two circuits in operation at one and the same time. In Fig. 1 we have a high speed circuit, and it is obvious that all other circuits are open.

The high speed circuit shown in this diagram is traced as follows: From plus of the battery, through flexible shaft safety contact FS, through the brake solenoid 30 of air release valve EAV, circuit closer PHS′, speed indicator contact SIC, high speed segment HSS and high speed contact $hs$, contact arm of primary relay to "clear" contact CL, through retarded magnets DR , and green light G to the negative pole of the battery. All other signals will be out, the red and yellow because contact C of the rotary distance control RDC will not be in engagement with either contact segments $r$ or $y$ thereof, worm DS being out of mesh with mutilated gear N. Advance caution signal Y¹ will also be out, because the contact arm of primary relay PR will not be on advance caution signal contact A$d$.

There is also a neutral circuit which is established only when the primary relay is energized, traced as follows: From the neutral tap of the battery, primary relay contact CL, through the coils of relay DR, green light to the negative side of the battery.

It will be obvious from the diagram and the condition of the circuit shown thereon that if any of the energized wires break or open, a resultant brake application will take place, consequent upon deenergizing of the brake solenoid 30, viz, if the wire of the first circuit traced should break or open at high speed, an immediate brake application will result, but the green light will still persist, and the engineer will thus be advised that the brake application resulted from the breaking of the circuit wire and not from absence of current from the track, so that this neutral circuit is merely a check circuit for the high speed circuit.

High speed advance caution block.

This condition of the apparatus is one that follows when the engineer passes a clear signal and approaches the next fixed caution indication.

The engineer now is in the advance caution block where a reverse polarized condition of the trackage exists. This changes his cab indications by reversing the polarity of the primary relay PR, causing its contact arm to swing leftward on to LC, AD, AHS, and HSAS, during which action the retarded magnets DR will maintain the armature $ar$ and worm DS picked up.

The circuit can be traced as follows: From the plus of the battery, through flexible shaft contact FS, solenoid 30 of air release valve EAV, PHS′, SIC, segment HSS, advance high speed contact AHS, primary relay arm to A$d$, through yellow light Y¹, through coils of DR, green light and to the negative side of the battery.

This circuit keeps the solenoid 30 of EAV valve energized and holds the brakes off. The yellow and green lights give the engineer an indication that he is approaching a caution signal, and if he does not govern the speed of his train in accordance with this advance indication, he will receive an automatic stop at the next board.

Another circuit is provided from the neutral tap of the battery, primary relay armature contact LC, through the coils LM of lock LO, to the negative side of the battery.

This circuit attracts the armature LO of the lock magnet LM to its unlocked position. A third circuit is established, traced as follows: from the plus of the battery through FS, solenoid 30 of air release valve EAV, PHS′, SIC, HSS, high speed wire through A$hs$, through HSAS, circuit breaker $cb$ hereinafter described, through the DVL (disabling valve lock), to the negative side of the battery. The function of this circuit will be described later. It may be briefly stated at this point, however, that the purpose of contact HSAS is to release lock DVL (disabling valve lock) in the event that conditions such as throwing a switch have brought on a brake application and closed and locked the disabling valve, and thereafter normal conditions have been restored.

In such a case the return of the armature of primary relay PR to the left would establish a circuit through HSAS to release disabling valve lock DVL so that the engineer can open the disabling valve and recharge the train line and proceed. If contact HSAS were not used he would have to wait until speed indicator contact SIC got onto no speed contact OS before DVL would be released.

High speed caution block.

The condition of the apparatus here is one that results immediately after the engineer has disobeyed the indication and has passed the caution board into dead territory at high speed. As will be noted, energy has gone from all circuits above mentioned by reason of the primary relay being devoid of energy from the track and its contact arm having therefore assumed a neutral position. The only circuit established under this condition is that traced as follows: from the neutral tap of the battery, through rotary contact C of the rotary distance control RDC, strip $y$ through the yellow light Y, to the negative side of the battery, indicating to the engineer that he has received a brake application in caution territory, for the reason that he was negligent in not reducing to control speed when he received the indication. Under this condition solenoid 30 of air release valve EAV is deenergized and there is no current in magnet of disabling valve lock DVL so that he has a brake application and cannot release, owing to disabling valve lock DVL being in locked position, unless a condition arises warranting a release. It will be seen that the armature 1-$ar$ has dropped leftward and as the magnet LM is deenergized the lock LO has dropped behind collar 4, locking it in this position in connection with mutilated gear N.

The worm DS will cause the gear N to rotate until contact $35m$ carried thereby gets on the insulated segment $35i$, but during this time the speed indicator contact SIC will be travelling anti-clockwise by reason of the train slowing down, until this contact arrives on the segment 35 of the speed indicator SI, when the solenoid 30 will again be energized and the automatic brake application will be lapped, the amount of brake application being determined by the distance between the location of SIC and 35 on the speed indicator dial at the time the braking took place. As said before, when this hand SIC arrives on the segment 35 a circuit will be established, traced as follows: from the plus of the battery, through FS, solenoid 30 of EAV, PHS', speed indicator contact SIC, segment 35, through $35m$, through contact strip $35s$, to wire 35M, and negative side of the battery. This will hold any further application from taking place until the worm DS has rotated the gear N sufficiently so that its mutilated part will be opposite the worm and contact $35m$ will be on insulation $35i$, when the last described circuit will again be open and another brake application will result, provided his train has not arrived to a point at or below 10 miles per hour, and the duration of this application will be for the distance between the location of SIC and the segment 10 on the speed indicator dial. When the speed of the train is retarded so that the indicator hand reaches the ten mile segment 10, another circuit will be established, traced as follows: from the plus of the battery, through FS, solenoid 30 of EAV, PHS', SIC, ten mile segment 10, wire 10M, to the negative side of the battery, which will hold the brakes off for proceeding at a safe low speed.

As above stated, when the vehicle enters the caution block, the contact arm of relay PR will go to neutral position. The solenoid 30 will deenergize and a brake application will ensure and the engineer cannot release the brakes, owing to the disabling valve being locked in closed position, unless a condition arises warranting a release. Such a condition would be a reversal of polarity of the track circuit, due to the train in advance getting into the second block ahead. This reversal of polarity of the track circuit would cause the arm of the primary relay PR to swing leftward. This would energize the magnet of the disabling valve lock DVL through the making of contact with HSAS, thus placing control of the opening of the disabling valve and the recharging of the train line in the hands of the engineer again through button $D^4$, and furthermore the magnet LM will be energized through contact LC, the lock LO will be released and the worm DS will be picked up by the magnets DR, so that the entire control will be in the hands of the engineer again to proceed, or stop, as he desires.

*Control speed caution block.*

The condition of the apparatus under this heading was effected when the engineer passed the caution signal at the moderate speed say of thirty M. P. H. It will be understood that the speed indicator contact SIC is now on the segment 35 and therefore a path of current is established from the plus pole of the battery, through FS, 30, PHS', SIC, segment 35, wire to $35m$, segment $35s$, through wire 35M, to the negative side of the battery, thus energizing brake solenoid 30 and holding brakes off. At the same time a circuit is established from the neutral tap of the battery, through rotary contact C, segment $y$, yellow light Y, to the negative side of the battery, thus giving the engineer an indication that he is in caution territory, and as the worm DS has fallen leftward and is locked in that position by the deenergization of the locking magnet LM, whose armature LO has dropped behind collar 4, the worm DS will continue to rotate the gear N until its mutilated part arrives at the worm. When this happens the contact $35m$ will be on the insulation $35i$, opening the only circuit through the solenoid and causing a brake application, which will persist until the train speed arrives at ten miles per hour, when the solenoid will be again energized through the ten mile circuit, as before described, and the application lapped and locked by the disabling valve lock DVL until a stop is effected or a change in polarity in the primary relay takes place. It will be seen from this that the engineer may continue running at any speed below thirty-five miles but only for the time that it takes the mutilated gear N to travel from its normal position until the rotary contact 35m arrives on the insulation 35i. This will bring the train at this speed within braking distance of the home board, where a stop will be absolute, if the condition indicated by the home board persists.

*Stop in caution block.*

The condition of the apparatus under this heading is a continuation of that just described. The apparatus is at rest with the train standing still at the home board and the circuits in the following condition: from the plus side of the battery, through FS, 30, PHS', SIC, no speed strip OS, through re-energized solenoid contact $D^{30}$ to the magnet of the disabling valve lock DVL, to the negative side of the battery. It will be obvious that under this condition the magnet of DVL is now energized, releasing the engineer's disabling valve lock, and the engineer may now open the disabling valve and recharge the train line to release his brakes. The condition of the board and block in advance is indicated by reason of the circuit being established from the neutral tap of the battery, through travelling contact C, segment r, wire through red light R to the negative side of the battery, and as there is no current in lock magnet LM, lock LO is in locking position behind collar 4, it is obvious that he can only start up and proceed by the red board and into the occupied block at a speed not to exceed ten miles per hour, for it will be seen that if he should attempt to do so, speed indicator contact SIC will leave the ten mile segment 10 and open that circuit, which is the only one that can be in at this time under the condition as indicated by the semaphore and cab signal.

The rotary gear N is under tension of, say, a pair of reversely set spiral springs like clock springs, which will return it to normal position when the worm is drawn away from it.

It will be obvious also that if the caution block is entered at or below ten miles an hour, he can proceed through this block without a stop, provided he does not increase speed.

*Entering occupied block, restricted speed.*

The indication of the lights, green and red jointly, gives positive knowledge to the engineer that he is in a block occupied by another train, as at no other time or under no other conditions will the green and red lights be lit at the same time. The primary relay is energized and is on contacts CL and hs and a circuit is established from the plus side of the battery, through FS, 30, PHS', SIC, ten mile segment 10, wire 10M to the negative side of the battery. It will be obvious that if he attempts to exceed a speed of ten miles, then speed indicator contact SIC will leave the ten mile segment 10 and a brake application will result, by reason of deenergizing brake solenoid 30. The lock magnet LM is still deenergized and its armature LO has locked DS in its fallen position and the thirty-five mile contact 35m is on the insulation 35i, effectually preventing any other circuit from coming into play under this condition. Thus we have a condition that restricts the speed of the train in occupied territory.

We have shown in this diagram a circuit breaker cb in the wire HSAS leading from the high speed advance signal contact. This circuit breaker is opened by the contact SIC when this gets on the ten mile per hour segment 10 of the current distributer CD, so that in the event that the train is running at ten miles per hour with brakes applied and the conditions change to that of advance caution, under which the arm of the primary relay will swing leftward and close on contact HSAS, there will be no energizing of the magnet $D^8$ of the disabling valve lock DVL, and the engineer cannot release his brakes while running at this low rate of speed of ten miles per hour, as this would be unsafe, owing to the liability of pulling the train apart.

With the primary relay on CL and hs and with contact SIC on the ten mile segment 10, there will be no energizing of the solenoid or magnet $D^8$ of the disabling valve lock DVL, because the circuit including this magnet would be open at OS, even though the circuit breaker cb be not used.

*Sequence of operation.*

High speed caution block: armature of primary relay PR goes to neutral, owing to absence of prescribed current in the track system. All primary relay contacts are thus broken. Magnets DR will deenergize and armature ar and worm DS will fall leftward, aided by spring as, allowing lock LO to drop behind shoulders ars.

Solenoid 30 will be deenergized by reason of the armature of relay PR assuming neutral position and breaking circuit between high speed contact hs and clear contact CL. The brakes will be applied immediately.

When the brakes are applied, the engineer's disabling valve is operated as in the Clifford system, to disable the engineer from recharging the train line and releasing the brakes. This valve, when in disabling position, is maintained closed by lock DVL. This lock is controlled by a magnet which is energized to release the lock when the train comes to a stop, with contact SIC on no speed contact OS, and contact at D³⁰ closes consequent upon reenergizing of solenoid 30. Thereupon the engineer can recharge the train line.

Reverting to armature ar: when this falls to the left the worm DS meshes with mutilated gear N and this begins to turn, according to the direction of movement of the engine, either forward or backward. In either case, the rotating contact C will engage one of the fixed contact strips y, and the yellow light Y will take the place of the green light G and yellow light Y¹. This yellow light Y will be maintained until the train almost comes to a stop. The red light will then come on, yellow will go out, and red will persist, while the vehicle is still in the caution block, or on dead territory.

This coming on of the red light will be due to strip r being engaged by contact C in either direction, according to the train movement.

Now considering what takes place at the speed indicator SI and its associated contacts: it will be seen that as soon as the solenoid 30 is deenergized and the train is slowing down, the contact hand SIC will travel anti-clockwise towards zero, and make contact with the thirty-five M. P. H. strip 35, which will close the thirty-five M. P. H. circuit 35M through rotary contact 35m, and the solenoid will be reenergized and the train will continue to run along, gradually slowing down under the application already made, and maintained by reason of the locked disabling valve.

This thirty-five M. P. H. circuit may be traced as follows: from plus of battery, to flexible shaft safety contact FS, solenoid 30, circuit closer PHS', speed indicator contact SIC, thirty-five mile strip 35, rotary contact 35m at the mutilated gear, strip 35s, circuit wire 35M, to minus of battery. This circuit will be maintained and consequently the solenoid will be maintained reenergized until the speed of the train gets down to, say, 15 M. P. H., when the solenoid will be deenergized again and a secondary brake application will go on. This will be due to the completion of the rotation of the mutilated gear bringing its contact 35m onto insulation 35i, breaking the thirty-five M. P. H. circuit at this point. This secondary braking will persist until the speed indicator hand SIC has reached the ten M. P. H. contact 10, whereupon the solenoid will be again reenergized through SIC, strip or contact 10, and then through wire 10M to minus of battery. The train is still slowing down, as the secondary brake application still persists, owing to the engineer's disabling valve remaining locked or set in position to disable the engineer from recharging the train pipe and releasing the brakes.

On reaching zero position, the contact hand SIC gets partly on the no speed contact OS, when the train comes to no speed or a stop. This contact hand is now bridging the insulated joint between the strips 10 and OS. The solenoid remains energized. A circuit will now be closed from contact hand SIC, through strip or contact OS, solenoid contacts D³⁰ (which will close when solenoid is reenergized), and DVL (disabling valve lock), to minus of battery. As a result, the engineer's disabling valve is unlocked and can be set in open position by the engineer, and he can then recharge the train line, release the brakes, and proceed, with solenoid reenergized ready for another automatic brake application.

In thus proceeding again, the engineer will be held down to ten miles per hour as long as he is in dead territory or in a caution block, for the reason that at this time the rotary element N has made its complete movement and its mutilated part is opposite the worm where it remains at rest and with the thirty-five mile circuit broken because of the insulated sector 35i having been engaged by the rotary contact 35m. Should, therefore, the engineer increase his speed to above ten miles per hour, the speed indicator contact SIC will get on the strip 35 and because this strip is wired to contact 35m, this circuit will be broken at the now underlying insulating sector 35i and the brake solenoid will be deenergized and the brakes will go on again. Furthermore, it will be obvious that when the train has been stopped automatically in a dead block, the engineer may release the brakes (his disabling valve having been opened) and start up again and proceed into the occupied block (which is an energized block). Under this condition, primary relay PR will be reenergized and its contact will close on CL and hs, and the following circuit will be made: from neutral tap of the battery through armature of PR, contact CL, through the DR magnets, green light to negative. Also the current from plus of battery will go through FS, 30, PHS', SIC, ten M. P. H. strip 10 of speedometer to the negative of the battery. During this time LO still remains in its fallen position, locking worm DS against the attraction of the magnets DR, with the worm gear in mesh with its mutilated part, so that contact 35m is over insulating sector 35i, and the 35 M. P. H. circuit is open.

The contact C of the mutilated gear N will be contacting with the strip r and the red light will still persist. Under this condition, if the engineer attempts to accelerate above ten M. P. H., the contact SIC of speed indicator SI will leave the ten M. P. H. strip 10, and as the thirty-five M. P. H. strip is deenergized, an automatic application will result. This makes it obvious that he cannot go at unrestricted speed in an occupied block, and he can determine whether the block is occupied or not by the lights being green and red, as only under this condition will those two lights be lighted at the same time. Under the above condition, the engineer cannot resume a higher speed until the advance caution condition prevails, resulting in releasing lock LO, and rotary member N restoring to normal position.

Caution block moderate speed, of say thirty-five M. P. H.: in this condition all contacts at primary relay PR are open; solenoid 30 is energized the same as just stated above when SIC got on the thirty-five M. P. H. strip 35. Braking will occur when rotary contact 35m gets on insulating sector 35i.

There is this difference between this condition and the one described above, i. e., high speed in caution block, in that no secondary braking takes place in the example now being considered, i. e., moderate speed in a caution block.

*Prohibitive high speed clear block.*

The apparatus is in the condition brought about by the engineer exceeding the predetermined high speed limit, which is arbitrarily set at seventy miles per hour. It will be noted that the speed indicator contact SIC, in accordance with the speed of the train, has left the high speed segment HSS and opened the high speed circuit controlled by said segment HSS, and at the same time has opened another circuit traced as follows: from the neutral tap of the battery, PSC (prohibitive speed contact), PHS (prohibitive high speed segment), through the retarded magnet PM, magnet DVM (disabling valve magnet), to the negative side of the battery. This circuit is broken by reason of the contact arm SIC forcibly opening the contact at PSC and this in turn opens the EAV circuit at PHS' by deenergizing magnet PM. The magnet DVM is also deenergized. The magnet PM is retarded in respect to the magnet DVM so that the magnet DVM will deenergize first and allow the disabling valve nullifier valve DVN to drop and cut off communication through air pipe 51 to the engineer's disabling valve, to thereby prevent the engineer from being disabled, as it is not intended under this condition of high speed to bring the train to a stop, but merely to reduce its speed. A brake application will be had which will retard the movement of the train and cause the indicator contact SIC to move anti-clockwise until it again reaches the HSS segment, when the above described prohibitive high speed circuit will be closed at PSC, closing PHS', and the solenoid 30 will be energized again, and both magnets PM and DVM, by the closing of this circuit at PSC, will again be energized, closing PHS' and opening up communication between pipe 51 and the engineer's disabling valve, automatically allowing the brakes to be released by recharging the train pipe, as the handle of the big brake valve would be in running position during this normal movement, for if he had it lapped, the engineer would himself hold the brake application had in effect. It will thus be seen from this diagram that he is effectually prohibited from exceeding a speed above that for which the apparatus is set.

Assuming that the prohibitive high speed condition above described takes place in a clear block, the green light will be lighted through a circuit as follows: plus of battery, CL, DR magnets, green light, to minus of battery.

The disabling valve lock DVL may be controlled through the no speed contact OS alone, i. e., without using the circuit closer $D^{30}$ at the solenoid 30 as a secondary circuit closing means, but I prefer the arrangement first described in which both controls are present.

Reverting to Fig. 2: I have already partly described this mechanism, which represents elements of the diagram Fig. 1, in modified form and arrangement, and it may be further said that the lock LO in this form of the invention is formed by the solenoid core and a collar $4^a$ on the same sleeve with the shiftable pinion *spi*. This collar with the sleeve and pinion is pressed rightward by a spring *as*. The sleeve has an armature *ar* attached to it which is attracted by the magnet DR when energized to hold the pinion *spi* normally out of engagement with the mutilated gear N. In this figure the contacts C and 35m are fixed instead of being rotatable, as in the diagram, and the current distributer *cd* rotates instead of being fixed, as in the diagrams. The segments 35s, *y*, *r*, correspond to those marked in the diagram, Fig. 1.

When the magnet DR is deenergized the spring *as* forces the sleeve rightward to make pinion *spi* mesh with the mutilated gear N and at the same time the collar $4^a$ will move rightward and lock LO will drop behind, it thus holding pinion *spi* in engagement with gear N. The sleeve of pinion *spi* is driven by a gear 32, pinion 33, shaft 34 and gearing 35. This Fig. 2 also shows a modified arrangement of means to bring the train down from a prohibitive high speed. This consists of a valve 76ˣ for releasing equalizing reservoir air through by-pass port 52ᵉ and thus reducing pressure in the equalizing piston chamber of the engineer's automatic service valve H⁶ when the travelling contact SIC of the speed indicator is turned to the prohibitive high speed position, corresponding to contact strip PHS of the diagrams. When this transpires the shaft or tubular valve 19 will have been turned to cause a cam 19ˣ thereon to force the valve 76ˣ open and allow equalizing reservoir pressure to escape to atmosphere through the by-pass port 52ᵉ, and restricted port 57ᶠ to thus apply the brakes. As soon as the speed of the train is reduced the shaft 19 will have turned to bring the low part of the cam to the stem of valve 76ˣ, allowing this valve to close under spring pressure and thus stop further reduction of pressure in the equalizing piston chamber D of the Westinghouse system. The engineer can now recharge the train line and release the brakes, because in the above automatic action no air has been supplied to the engineer's disabling valve and this remains open. This is due to the fact that the passage 52ᵉ by-passes the electric air valve EAV and the passage leading to the pipe 51 through which the disabling valve is operated.

It will be understood that instead of using the apparatus shown in Fig. 2, other forms of automatic air release valves may be employed.

Fig. 5 illustrates another form of mechanism for operating the hand SIH of the speed indicator from the rotor 15.

Dead head valve of second engine.

I have provided means whereby the operation of what is known as the dead head valve or cut-out cock of an engine to closed position for rendering said engine dead as to capacity to apply the brakes will prevent the brake solenoid of the dead engine from becoming deenergized, releasing train line air and applying the brakes. The cut-out cock in air brake systems, generaly, is located under the engineer's automatic brake valve in the train pipe. I show in Fig. 1 such a valve at DHV. In my improvement it has a circuit closer cc combined therewith, which, when the cock is set in closed position to make the engine dead as to application of the brakes, will close a circuit to the solenoid 30 and keep this energized under all conditions of the block, so that there will not be any release of train line air at this point in the system. When this engine is coupled as a second engine in a train it is rendered dead by the closing of the cut-out cock, and on the other hand, this cock is opened to restore control to the engineer when his engine is used alone or as a first engine. In the latter case the circuit just described is broken at cc and therefore the brake solenoid 30 is now subject to operation by the electrical condition of the system.

Running forward or backward.

The apparatus above described will work equally well whether the vehicle is running either forward or backward, for it will be noticed that the rotary distance control mechanism RDC will operate the same in either direction and exert like control under like conditions and so far as the speed indicator is concerned, this works always in the same direction, whether the train is moving forward or backward, its operation depending upon the operation of the weight 15, and this is influenced as to its inclined position by speed alone, and not by direction of movement of the vehicle.

It will be understood, of course, that instead of employing the compartment receptacle 25, shown in Fig. 2, combined with the solenoid valve EAV, this valve may be employed in connection with other means for reducing equalizing reservoir air pressure and causing a brake pipe reduction.

Track circuits.

The presence of a potential drop in one of the track rails—i. e., of a current flowing through that rail, is the means whereby the engine circuits are controlled through the primary relay to give a clear signal, its absence the factor for controlling the display of the caution or danger signal in the cab and the stopping of the train, and the reversal of the polarity of this current is the means whereby the engineer is advised that he is approaching a caution signal.

Referring to the diagram, Fig. 10, this shows wiring for only four blocks with advance indication in but three blocks. This wiring governs only the condition of unidirectional traffic, but it is to be understood that by a suitable development of relay connections and contacts it may be applied to any desired conditions of train movement, and for double directional traffic.

The circuits used are D. C. polarized circuits of the double rail type, but the invention is not limited to this. The imposed circuits are carried to the rails over two No. 6B. and S. gage copper wires and equalized by keeping the voltage in the two rails balanced with the line. The imposed voltage is approximately 10 volts per circuit. In order to get the advance indication the polarity is reversed on the imposed circuit. Current is required in each block section to permit the train to proceed and in this manner the apparatus is made self checking. The circuits which can be used are the double rail imposed circuit, the single rail imposed circuit or the diagonal wired double rail imposed circuit. These have been designed to meet varying conditions and their application is not confined to D. C. steam road operation.

A detailed description of the circuits follows:—

Suppose a train enters block #3. Track relay T of the block #3 will deenergize and the contacts 125—126 will open circuit from the local battery LB and relay Ax contacts 123 and 124, 115 and 116 close the main circuit as follows:

Left rail: plus of the main battery III$^1$, contact 114, pole line, contacts 115 and 116, left rail from point 118 to 151, conductor 151—119, contacts 119—110, contact 111, minus of battery.

Right rail: plus of the main battery III, contact 122, pole line, contacts 123—124, right rail from point 117 to 161, conductor 161—171, contact 171—181, contact 191, minus of battery. The described paths of the main current on block #3 can exist only when the block ahead, #4, is clear. Relay Ax of this block is energized and contacts of this relay 119—110, 171—181 are closed. If, however, another train is on block #4, then the above described circuits of the main current on block #3 will open and the train entering this latter block will be stopped automatically by the absence of control current in the rails. Relay Bx of block #3 is shown energized. This condition will exist when blocks #4 and #5 are clear. Working circuit for this relay is: relay Bx, point 127, pole line, plus of the main battery IV on block #4, minus of battery, contacts 181—171, right rail from 161 to 117, contact 124, relay Bx. If, however, relay Ax on block #5 is deenergized, by presence of another train in this block, contacts 171—181 will open above described circuit of relay Bx and its contacts drop. Contact arms of relay Bx will reverse the direction of main circuit on block #3, as can be easily traced from the drawing, this opposite direction of current in the rails will light an additional "advance signal" in the cab of the locomotive, as already described.

It must be understood that relay Bx indicated at block intersection 82.2 should be placed at each block intersection, if the wiring of the tracks is to be continued. At intersections 85.2 and 81.2 connections of relays correspond to the ends of a Clifford installation.

It will be seen that my system is one of conductive continuous type, as distinguished from ramp systems or systems operating on the inductive system, but the invention is not limited to the use of direct current to be picked up from the rails by the primary relay.

This primary relay is of the form disclosed in my prior applications, and it may be the Weston Model 30 D'Arsonval galvanometer, as shown in Fig. 11 diagrammatically.

This relay is like that made by The Weston Electrical Instrument Co. of Newark, N. J., under patents of the United States granted Nov. 6, 1888; Apr. 29, 1890; Feb. 17, 1891; Dec. 19, 1893; Oct. 4, 1898; and July 16, 1901.

This is shown in Fig. 11, in which the pointer or swinging contact arm is carried by a spool or coil $p^1$, arranged to turn between the pole pieces of a magnet $p^2$, when current passes through the coil from the rail or rails, and thus set the arm against its contact.

The rail or frame of the vehicle provides a bridge between the terminals of the coil or spool and the current produced by the tendency of the spool to vibrate, when receiving no current from the rail, and when subjected to jar a shock will oppose the vibration of the coil and thus maintain the pointer or swinging arm in neutral position out of engagement with its contacts, thus rendering the relay suitable for controlling apparatus on a locomotive where more or less vibration necessarily takes place.

In the drawing the spool is shown as connecte directly with its leads, the coil springs ordinarily used between the spool terminals and the leads being omitted for clearness of illustration.

The current is conducted to the primary relay PR from the traffic rails without amplification or augmentation through the brasses of the journal boxes to which brasses the ends of the conducting wire are electrically connected, so that the current passes up from the rail through the wheel, the brasses, the conducting wire, the primary relay and thence through the other end of the conducting wire to the brass of another wheel, through the said wheel and thence through said wheel back to the traffic rail system.

The primary relay may be connected up with the brasses of the locomotive, or at one end with the brass of the front wheel of the locomotive, and at the other end with the brass of the rear wheel of the tender, or the connection may be made in any of the ways shown in my prior application.

The locomotive and tender is of standard type, no insulation of axles, wheels or other parts of the standard equipment is used in my invention, and no brushes and collector rings are employed in transmitting the current from the wheels or axles to the primary relay.

I claim:—

1. In combination, in train control apparatus, a primary relay, an electro-magnetic brake device, a speedometer having a movable member to make electrical contact at high speed of the vehicle and to make another contact at a lower speed, said speedometer having also a moderate speed contact, means for operating said member by the movement of the vehicle, a distance control mechanism having a member to be driven by the movement of the vehicle and controlled by the primary relay to remain at rest when said primary relay is energized and to be driven when the primary relay is deenergized, said distance control mechanism when in action, closing a contact to cooperate with the moderate speed contact of the speedometer to maintain the circuit through the electro-magnetic brake device for holding the brakes off for a prescribed distance of vehicle travel in the dead block, and then breaking said circuit, and a high speed contact at the primary relay cooperating with the high speed contact of the speedometer to maintain the circuit through the electro-magnetic device at high speed in a clear block, said primary relay breaking said circuit on dead territory, substantially as described.

2. In combination, in train control apparatus, a primary relay, an electro-magnetic brake device, a speedometer having a movable member to make electrical contact at high speed of the vehicle and to make another contact at a lower speed, said speedometer having also a moderate speed contact, means for operating said member by the movement of the vehicle, a distance control mechanism having a member to be driven by the movement of the vehicle and controlled by the primary relay to remain at rest when said primary relay is energized and to be driven when the primary relay is deenergized, said distance control mechanism, when in action, closing a contact to cooperate with the moderate speed contact of the speedometer to maintain the circuit through the electro-magnetic brake device for holding the brakes off for a prescribed distance of vehicle travel in the dead block, and then breaking said circuit, and a high speed contact at the primary relay cooperating with the high speed contact of the speedometer to maintain the circuit through the electro-magnetic device at high speed in a clear block, said primary relay breaking said circuit on dead territory, said distance control member being moved in one direction or the other, according to the direction of movement of the vehicle, and in either case producing like effects, substantially as described.

3. In combination in train control apparatus, a primary relay, an electro-magnetic brake device, a speedometer having a movable member to make electrical contact at high speed of the vehicle and to make another contact at a lower speed, means for operating said member by the movement of the vehicle, a rotary distance control mechanism having a magnet controlled by the primary relay, and having a rotary element which is normally inactive, with means for rotating the same from the train movement when said magnet is deenergized upon the primary relay assuming neutral position, a high speed contact at the primary relay, said contact cooperating with the high speed contact of the speedometer to maintain the circuit through the electro-magnetic brake device, an electric contact at the rotary distance control mechanism cooperating with the lower speed contact of the speedometer to maintain the circuit through the brake device for a prescribed distance of vehicle travel when said vehicle is proceeding at said lower speed with the primary relay in neutral position, and the rotary distance control mechanism in action, and breaking said circuit after the prescribed distance into the block has been traversed, all of said elements being on the vehicle, substantially as described.

4. In combination in train control apparatus, a primary relay, an electro-magnetic brake device, a speedometer having a movable member to make electrical contact at high speed of the vehicle and to make another contact at a lower speed, means for operating said member by the movement of the vehicle, a rotary distance control mechanism having a magnet controlled by the primary relay, and having a rotary element which is normally inactive, with means for rotating the same from the train movement when said magnet is deenergized upon the primary relay assuming neutral position, a high speed contact at the primary relay, said contact cooperating with the high speed contact of the speedometer to maintain the circuit through the electro-magnetic brake device, an electric contact at the rotary distance control mechanism cooperating with the lower speed contact of the speedometer to maintain the circuit through the brake device for a prescribed distance of vehicle travel when said vehicle is proceeding at said lower speed with the primary relay in neutral position, and the rotary distance control mechanism in action, and breaking said circuit after the prescribed distance into the block has been traversed, all of said elements being on the vehicle, said rotary distance control mechanism rotating either forward or backward according to the direction of travel of the vehicle and producing like action in either case, substantially as described.

5. In combination in train control apparatus, a primary relay, an electro-magnetic brake device or solenoid, a speedometer having a travelling member to make an electrical contact at high speed, another at moderate speed and another at a safe low speed, a distance control mechanism having a magnet controlled by the primary relay, and having a movable member which is normally inactive, with means for giving the same travelling movement from the train movement, when said magnet is deenergized upon the primary relay assuming neutral position, a high speed contact at the primary relay, said contact cooperating with the high speed contact of the speedometer to maintain the circuit through the brake solenoid, a moderate speed contact closed at the distance control mechanism by the movement of its movable member and cooperating with the moderate speed contact of the speedometer to maintain the circuit through the brake solenoid for a prescribed distance of vehicle travel when said vehicle is proceeding at moderate speed with the primary relay neutral, and breaking said moderate speed circuit through the brake solenoid and speedometer after the prescribed distance has been traversed by the vehicle into the block, said low speed contact of the speedometer reenergizing the circuit through the brake solenoid when the movable member of the speedometer passes onto the same from the moderate speed contact, all of said elements being on the vehicle.

6. In combination in train control apparatus, a primary relay, an electro-magnetic brake device or solenoid, a speedometer having a travelling member to make an electrical contact at high speed, another at moderate speed and another at a safe low speed, a distance control mechanism having a magnet controlled by the primary relay, and having a movable member which is normally inactive, with means for giving the same travelling movement from the train movement, when said magnets are deenergized upon the primary relay assuming neutral position, a high speed contact at the primary relay, said contact cooperating with the high speed contact of the speedometer to maintain the circuit through the brake solenoid, a moderate speed contact closed at the distance control mechanism by the movement of its movable member and cooperating with the moderate speed contact of the speedometer to maintain the circuit through the brake solenoid for a prescribed distance of vehicle travel when said vehicle is proceeding at moderate speed with the primary relay neutral, and breaking said moderate speed circuit through the brake solenoid and speedometer after the prescribed distance has been traversed by the vehicle into the block, said low speed contact of the speedometer reenergizing the circuit through the brake solenoid when the movable member of the speedometer passes onto the same from the moderate speed contact, an engineer's disabling valve, a lock therefor, and a contact at the speedometer controlling the release of said lock when the train has assumed a prescribed condition in respect to speed, all of said elements being on the vehicle.

7. In combination in train stop apparatus, a brake applying device, a speedometer, circuits controlled by said speedometer at various prescribed speeds, which circuits include the brake applying device, a circuit breaker for said circuits, electro-magnetic means for holding said circuit breaker closed while the speedometer indicates said prescribed speeds, and for opening said circuit breaker when a high prohibited speed is attained until the speed has been lowered again to that prescribed, whereupon the circuit of said brake device will be reenergized by the closing of said circuit breaker, for the release of the brakes, substantially as described.

8. In combination in train stop apparatus, a primary relay, a brake applying device, a speedometer having a plurality of contacts to close circuits through said brake applying device at various prescribed speeds, and a rotary distance control element set in operation by the primary relay assuming neutral position, with means for driving it from the vehicle at speeds varying with the speed of the vehicle, said rotary distance control closing a moderate speed contact and cooperating with the moderate speed contact of the speedometer, and controlling the energizing of the brake applying device to hold the brakes off for a prescribed distance of travel of the vehicle in dead territory, substantially as described.

9. In combination in train stop apparatus, a primary relay, a brake applying device, a speedometer having a plurality of contacts to close circuits through said brake applying device at various prescribed speeds, and a rotary distance control element set in operation by the primary relay assuming neutral position, with means for driving it from the vehicle at speeds varying with the speed of the vehicle, said rotary distance control closing a moderate speed contact and cooperating with the moderate speed contact of the speedometer, and controlling the energizing of the brake applying device to hold the brakes off for a prescribed distance of travel of the vehicle in dead territory, said rotary distance control turning either forward or backward according to the direction of travel of the train and having its contacts operating similarly for either direction of motion, substantially as described.

10. In combination in train stop apparatus on the vehicle, a primary relay, a brake solenoid, a speed indicator having a movable contact member and cooperating contact members to close circuits through the brake solenoid at various speeds, one for high speed, one for moderate speed, one for low speed, and one for no speed, a high speed contact controlled by the primary relay and cooperating with the high speed contact of the speedometer, to close the circuit through the brake solenoid, said primary relay opening its high speed contact when the vehicle is on territory from which the prescribed current is absent, whereby the brakes will be set, a distance control relay having a movable member which is set in motion when the primary relay assumes neutral position, means for driving said member from the movement of the vehicle, contacts controlled by the movable member of said distance control mechanism to close the solenoid circuit through the moderate speed contact of the speedometer to thus reenergize the brake solenoid, said movable distance control member thereafter breaking said circuit to get a secondary braking action after a prescribed distance has been traversed, an engineer's disabling valve, an automatic lock therefor, said valve being set, to disable the engineer from recharging the train pipe, substantially at the time the brake solenoid applies the brakes and persisting during secondary braking, said low speed contact of the speedometer closing a circuit to energize the brake solenoid, and said no speed contact of the speedometer closing a circuit to release the disabling valve to thereby enable the engineer to recharge the train pipe, release the brakes, and proceed, said high, moderate, low and no speed contacts of the speedometer coming into action in the order named, substantially as described.

11. In combination in train stop apparatus on the vehicle, a primary relay, a brake solenoid, a speed indicator having a movable contact member and cooperating contact members to close circuits through the brake solenoid at various speeds, one for high speed, one for moderate speed, one for low speed, and one for no speed, a high speed contact controlled by the primary relay and cooperating with the high speed contact of the speedometer, to close the circuit through the brake solenoid, said primary relay opening its high speed contact when the vehicle is on territory from which the prescribed current is absent, whereby the brakes will be set, a distance control relay having a movable member which is set in motion when the primary relay assumes neutral position, means for driving said member from the movement of the vehicle, contacts controlled by the movable member of said distance control mechanism to close the solenoid circuit through the moderate speed contact of the speedometer to thus reenergize the brake solenoid, said movable distance control member thereafter breaking said circuit to get a secondary braking action after a prescribed distance has been traversed, an engineer's disabling valve, an automatic lock therefor, said valve being set, to disable the engineer from recharging the train pipe, substantially at the time the brake solenoid applies the brakes and persisting during secondary braking, said low speed contact of the speedometer closing a circuit to reenergize the brake solenoid, and said no speed contact of the speedometer closing a circuit to release the disabling valve to thereby enable the engineer to recharge the train pipe, release the brakes, and proceed, said high, moderate, low, and no speed contacts of the speedometer coming into action in the order named, said movable distance control member remaining in its operated position to break the moderate speed circuit should the engineer in proceeding after a stop, in dead territory, exceed the prescribed low speed and cause the speedometer to break its low speed contact and make its moderate speed contact, substantially as described.

12. In combination in train control apparatus, a polarized primary relay, an electro-magnetic brake device or solenoid, a speedometer having a travelling member to make electrical contact at high speed, another at moderate speed and another at safe low speed, a distance control mechanism having magnets controlled by the primary relay, and having a movable member which is normally inactive, with means for giving the same travelling movement from the train movement, when said magnets are deenergized upon the primary relay assuming neutral position, a high speed contact at the primary relay, said contact cooperating with the high speed contact of the speedometer to maintain the circuit through the brake solenoid, a moderate speed contact closed at the distance control mechanism by the movement of its movable member and cooperating with the moderate speed contact of the speedometer to maintain the circuit through the brake solenoid for a prescribed distance of vehicle travel when said vehicle is proceeding at moderate speed with the primary relay neutral, and breaking said moderate speed circuit through the brake solenoid and speedometer after the prescribed distance has been traversed by the vehicle into the block, said low speed contact of the speedometer reenergizing the circuit through the brake solenoid when the movable member of the speedometer passes onto the same from the moderate speed contact, an engineer's disabling valve, a lock therefor, and a contact at the speedometer controlling the release of said lock when the train has assumed a prescribed condition in respect to speed, all of said elements being on the vehicle, a lock to hold the distance control relay against resetting until the polarity of the primary relay is changed and it closes the advance caution contact, the said distance control relay, as long as it is not reset, maintaining the moderate speed circuit open, to cause another brake application by deenergizing the brake solenoid should the engineer exceed the prescribed low speed and cause the speedometer to break its low speed contact and make its moderate speed contact.

13. In combination in train stop apparatus on the vehicle, a primary relay, a brake solenoid, a speed indicator having a movable member and cooperating contact members to close circuits through the brake solenoid at various speeds, one for high speed, one for moderate speed, and one for low speed, a high speed contact closed by the primary relay and cooperating with the high speed contact of the speedometer to close the circuit through the brake solenoid, said primary relay opening its high speed contact when the vehicle is on territory from which the prescribed current is absent, whereby the brakes will be applied, a distance control mechanism having a movable member which is set in motion when the primary relay assumes neutral position, means for setting said member in motion from the movement of the vehicle, contacts controlled by said movable member of the distance control mechanism to close the solenoid circuit through the moderate speed contact of the speedometer to thus reenergize the solenoid, said distance control mechanism thereafter breaking said circuit to get a secondary braking action after a prescribed distance has been traversed into the block, said low speed contact of the speedometer closing a circuit to reenergize the brake solenoid when the speed of the vehicle has been reduced to a prescribed limit, said distance control mechanism remaining in its operated position to break the moderate speed circuit should the engineer exceed the low speed limit, and an advance caution contact closed by the primary relay under a change of polarity of the current consequent upon the train ahead getting a prescribed distance away, said advance caution contact controlling the resetting of the distance control mechanism to normal position, substantially as described.

14. Automatic train stop apparatus, comprising a primary relay, a rotary distance control mechanism controlling certain circuits of said apparatus, said mechanism comprising a mutilated gear, contact strips, contacts cooperating therewith, a worm for driving said gear, electro-magnets for controlling the engagement and dis-engagement of said gear and worm, said mutilated gear when turned to bring its mutilated portion opposite the worm, remaining in this operated position until the gear and worm are separated, whereupon the gear will return to normal position, said worm being driven by the vehicle's movement and turning the gear either one way or the other according to the direction of said movement, the said gear performing like circuit closing and breaking actions for either direction of movement, substantially as described.

15. In combination in train stop apparatus, a primary relay, a distance control mechanism comprising a rotary member carrying signal contacts, and a moderate speed contact, means for driving the same from the movement of the vehicle, electromagnetic means controlled by the primary relay for controlling the driving means, a brake solenoid, a speedometer having a contact member, and contacts traversed thereby for different prescribed speeds, said contacts controlling severally the circuit of the brake solenoid, one of said contacts being a moderate speed contact cooperating with the moderate speed contact of the distance control mechanism, for keeping the solenoid circuit closed during the traverse of the vehicle into the block for a prescribed distance.

16. In combination in train stop apparatus, a primary relay, a brake solenoid, a speedometer having a travelling contact and cooperating contacts engaged thereby at different speeds of the vehicle, means for operating said speedometer from the vehicle, a high speed contact at the primary relay for closing the circuit through the brake solenoid, at high speed, in cooperation with the high speed contact of the speedometer, a distance control mechanism, said distance control mechanism having travelling contact means, with means for driving the same from the movement of the vehicle, means for controlling the times of effective operation of said driving means from the primary relay so that the distance control mechanism will be driven in dead territory, a moderate speed contact at the distance control member cooperating with the travelling contact means thereof, and with the moderate speed contact of the speedometer to energize the solenoid circuit, for a prescribed distance of vehicle travel within dead territory, and thereafter to break said circuit, for a brake application, a clear signal controlled by the primary relay, a caution signal which is set by and when the travelling contact means of the distance control mechanism moves from normal position, a danger signal which is set by and when said travelling contact means of the distance control mechanism breaks the moderate speed solenoid circuit, and removes the caution signal, substantially as described.

17. In combination in train stop apparatus, a primary relay, a brake solenoid, a speedometer having a travelling contact and cooperating contacts engaged thereby at different speeds of the vehicle, means for operating said speedometer from the vehicle, a high speed contact at the primary relay for closing the circuit through the brake solenoid, at high speed, in cooperation with the high speed contact of the speedometer, a distance control mechanism, said distance control mechanism having travelling contact means, with means for driving the same from the movement of the vehicle, means for controlling the times of effective operation of said driving means from the primary relay so that the distance control mechanism will be driven in dead territory, a moderate speed contact at the distance control member cooperating with the travelling contact means thereof, and with the moderate speed contact of the speedometer to energize the solenoid circuit, for a prescribed distance of vehicle travel within dead territory, and thereafter to break said circuit, for a brake application, a clear signal controlled by the primary relay, a caution signal which is set by and when the travelling contact means of the distance control mechanism moves from normal position, a danger signal which is set by and when said travelling contact means of the distance control mechanism breaks the moderate speed solenoid circuit, and removes the caution signal, said travelling contact of the distance control mechanism moving in either one direction or its opposite direction according to the direction of movement of the vehicle, and having a second set of contacts like those mentioned, to cooperate with the travelling contact means thereof, to produce similar actions for travel in the opposite direction, substantially as described.

18. In combination in train stop apparatus, a primary relay, a brake solenoid, a speedometer having a travelling contact and cooperating contacts engaged thereby at different speeds of the vehicle, means for operating said speedometer from the vehicle, a high speed contact at the primary relay for closing the circuit through the brake solenoid, at high speed, in cooperation with the high speed contact of the speedometer, a distance control mechanism, said distance control mechanism having a travelling contact means, with means for driving the same from the movement of the vehicle, means for controlling the times of effective operation of said driving means from the primary relay so that the distance control mechanism will be driven in dead territory, a moderate speed contact at the distance control member cooperating with the travelling contact means thereof, and with the moderate speed contact of the speedometer to energize the solenoid circuit, for a prescribed distance of vehicle travel within dead territory, and thereafter to break said circuit, for a brake application, a clear signal controlled by the primary relay, a caution signal which is set by and when the travelling contact means of the distance control mechanism moves from normal position, a danger signal which is set by and when said travelling contact means of the distance control mechanism breaks the moderate speed solenoid circuit, and removes the caution signal, said travelling contacts of the speedometer and of the distance control mechanism being rotatively mounted.

19. In combination in train stop apparatus, a primary relay, a brake solenoid, a speedometer having a travelling contact and cooperating contacts engaged thereby at different speeds of the vehicle, means for operating said speedometer from the vehicle, a high speed contact at the primary relay for closing the circuit through the brake solenoid, at high speed, in cooperation with the high speed contact of the speedometer, a distance control mechanism, said distance control mechanism having travelling contact means, with means for driving the same from the movement of the vehicle, means for controlling the times of effective operation of said driving means from the primary relay so that the distance control mechanism will be driven in dead territory, a moderate speed contact at the distance control member cooperating with the travelling contact means thereof, and with the moderate speed contact of the speedometer to energize the solenoid circuit, for a prescribed distance of vehicle travel within dead territory, and thereafter to break said circuit, for a brake application, a clear signal controlled by the primary relay, a caution signal which is set by and when the travelling contact means of the distance control mechanism moves from normal position, a danger signal which is set by and when said travelling contact means of the distance control mechanism breaks the moderate speed solenoid circuit, and removes the caution signal, a low speed contact at the speedometer cooperating with the travelling contact thereof to reenergize the brake solenoid at a prescribed low speed to proceed in an occupied block, whereupon the clear signal will be lighted by the primary relay, a lock for holding the distance control relay in its operated position so that the danger signal will persist with the clear signal, means for releasing said lock under prescribed safe traffic conditions, and means for restoring the distance control mechanism, substantially as described.

20. In combination in train stop apparatus, a primary relay, an electro-magnetic brake controlling device, a speedometer operated from the movement of the vehicle, a high speed contact controlled by the speedometer, and a high speed contact controlled by the primary relay for closing the circuit through the brake controlling device, a distance control mechanism to be driven by the movement of the train, electro-magnetic means controlled by the primary relay for determining the times of movement of said distance control mechanism, said distance control mechanism in cooperation with the speedometer, establishing a moderate speed circuit through the brake device for a prescribed distance of travel of the vehicle, and thereafter breaking said circuit, and a low speed circuit for reenergizing the brake device for the release of the brake, said circuit being established by the speedometer, substantially as described.

21. In combination in train control apparatus, a device which when deenergized will set the brakes, an automatic engineer's disabling valve to prevent him from recharging the train line, means to set said valve in disabling position when the brakes are set at certain speeds, and means for automatically nullifying the disabling valve when the brakes are set at a prohibited high speed, and for automatically restoring the disabling valve to functioning condition when the speed is again lowered, substantially as described.

22. In combination in train control apparatus, a device which when deenergized will set the brakes, an automatic engineer's disabling valve to prevent him from recharging the train line, means to set said valve in disabling position when the brakes are set at certain speeds, and means for automatically nullifying the disabling valve when the brakes are set at a prohibited high speed, and for automatically restoring the disabling valve to functioning condition when the speed is again lowered, said nullifying means comprising a valve to cut off operative air from the disabling valve, a magnet controlling said cut-off valve, a speedometer having contacts closed thereby at various permissible speeds for energizing said magnet, the circuit to said magnet being opened when the speedometer indicates the prohibitive speed, and a circuit breaker in the circuit of the brake device which deenergizes the same when the magnet circuit is deenergized, substantially as described.

23. In combination in train stop apparatus on the vehicle, a primary relay, a brake solenoid, a speed indicator having a movable contact member and cooperating contact members to close circuits through the brake solenoid at various speeds, one for high speed, one for moderate speed, one for low speed, and one for no speed, a high speed contact controlled by the primary relay and cooperating with the high speed contact of the speedometer, to close the circuit through the brake solenoid, said primary relay opening its high speed contact when the vehicle is on territory from which the prescribed current is absent, whereby the brakes will be set, a distance control relay having a movable member which is set in motion when the primary relay assumes neutral position, means for driving said member from the movement of the vehicle, contacts controlled by the movable member of said distance control mechanism to close the solenoid circuit through the moderate speed contact of the speedometer to thus reenergize the brake solenoid, said movable distance control member thereafter breaking said circuit to get a secondary braking action after a prescribed distance has been traversed, an engineer's disabling valve, an automatic lock therefor, said valve being set, to disable the engineer from recharging the train pipe, substantially at the time the brake solenoid applies the brakes and persisting during secondary braking, said low speed contact of the speedometer closing a circuit to reenergize the brake solenoid, and said no speed contact of the speedometer closing a circuit to release the disabling valve to thereby enable the engineer to recharge the train pipe, release the brakes, and proceed, said high, moderate, low and no speed contacts of the speedometer coming into action in the order named, an advance caution contact at the primary relay which is closed thereby when the current through the primary relay reverses, a lock to hold the distance control relay against resetting until the polarity of the primary relay is changed and it closes the advance caution contact, the said distance control relay, as long as it is not reset, maintaining the moderate speed circuit open, to cause another brake application by deenergizing the brake solenoid should the engineer exceed the prescribed low speed and cause the speedometer to break its low speed contact and make its moderate speed contact, substantially as described.

24. In combination in train control apparatus, a device which when deenergized will set the brakes, an automatic engineer's disabling valve to prevent him from recharging the train line, means to set said valve in disabling position when the brakes are set at certain speeds, and means for automatically nullifying the disabling valve when the brakes are set at a prohibitive high speed, and for automatically restoring the disabling valve to functioning condition when the speed is again lowered, a magnet controlling said nullifying means, a speedometer having contacts closed thereby at various permissible speeds for energizing said magnet, the circuit to said magnet being opened when the speedometer indicates the prohibitive speed, and a circuit breaker in the circuit of the brake device which deenergizes the same when the magnet circuit is deenergized, substantially as described.

25. In combination in an automatic train control system on the vehicle, the combination of a brake solenoid, a primary relay, a speedometer, circuit connections controlled thereby, an engineer's disabling valve, a lock therefor, electro-magnetic means for releasing said lock, an advance caution contact, closed by the primary relay when said relay reverses under reverse polarity of current picked up from the track rail system, said releasing means being in circuit with said advance caution contact, to be operated for releasing when said circuit is energized, and means connected with the speedometer for breaking said circuit to prevent releasing said lock when the speedometer indicates a prescribed low speed.

26. In combination in an automatic train control apparatus, a primary relay on the vehicle to receive current from the track rail system, automatic brake controlling means, circuit connections on the vehicle in which said brake applying means is included, a contact closed by said primary relay when said relay is energized by normal polarity current for holding said brake applying means inactive, an engineer's disabling valve, a lock for said valve, an advanced caution contact closed by said primary relay for energizing the circuit of the brake applying means to hold the brakes off when a current of reversed polarity is received by said primary relay, said disabling valve lock being controlled by a magnet, said magnet being in circuit with said advance caution contact whereby when said primary relay closes said contact the disabling valve lock will be released to place recharging of the train line under the control of the engineer.

27. In combination in train control apparatus, a primary relay, a brake solenoid which when de-energized brings on a brake application, an engineer's disabling valve, a lock for the disabling valve, a high speed advance caution contact which is closed by the primary relay under reverse polarity conditions, said contact being in circuit with the disabling valve lock to release the same to thereby enable the engineer to recharge the train pipe if reversed polarized conditions are restored with the solenoid again energized.

28. In combination in train control apparatus, electro-magnetic means for causing application of the brakes when de-energized, a dead heading valve in the train pipe for rendering the engineer's valve dead as to capacity to apply the brakes, a circuit in which the said electro-magnetic means and the movable part of said valve is included, said circuit being energized when said dead head valve is set in position to close the train pipe, and deenergized when the said valve is open, and primary relay means on the engine, receiving current from the rail system with circuit connections for controlling said electro-magnetic means, substantially as described.

29. In combination with electrical means on the vehicle for controlling the application of the brakes, a dead head valve for rendering the engineer's brake valve ineffective, and means operating when said valve is closed to nullify said electrical means, substantially as described.

30. In combination automatic brake applying means on the vehicle, a dead head valve for rendering the engineer's brake valve ineffective, said dead head valve being located in the train pipe, and means operated by said dead head valve for preventing the operation of the automatic brake applying means when said dead head valve is closed to cut off communication between the engineer's valve and the train line, substantially as described.

31. In combination in an automatic train control apparatus, a brake applying device, a circuit controlling the same on the vehicle, a signal included in said circuit lighted when said circuit is energized, a primary relay controlling said circuit and in turn controlled by a track circuit to maintain said vehicle circuit when normal current is picked up from the track circuit and to deenergize said vehicle circuit when abnormal track circuit conditions exist to thereby operate the brake device for a brake application, and a neutral circuit including the said signal and said primary relay when the latter is energized to maintain said signal when accidental rupture of the vehicle circuit takes place, and the brakes are applied, to thereby indicate to the engineer that a break in said circuit has occurred, substantially as described.

32. In combination in automatic train control apparatus, a primary relay receiving current from the track system, a brake controlling means on the vehicle, an engineer's disabling valve, a lock therefor, means for deferring automatic braking at moderate speeds, means for locking said brake deferring means in condition to perform its brake deferring action, electro-magnetic means for releasing the locking means of the disabling valve and the locking means of the brake deferring means, contact means closed by the primary relay when said relay receives current of reverse polarity and circuit connections controlled by said contact means for energizing said electro-magnetic means for releasing the said locks when said primary relay closes in said contact means, substantially as described.

In testimony whereof I affix my signature.

PATRICK J. CLIFFORD.